United States Patent [19]

Stoffelsma

[11] 4,339,278

[45] Jul. 13, 1982

[54] COLORING COMPOSITION FOR COLORING THERMOPLASTIC POLYMERS

[75] Inventor: Jan U. Stoffelsma, Hardenberg, Netherlands

[73] Assignee: Wavin B.V., Zwolle, Netherlands

[21] Appl. No.: 159,748

[22] Filed: Jun. 16, 1980

[51] Int. Cl.³ .................... C04B 31/40; C09C 3/08
[52] U.S. Cl. ....................... 106/308 Q; 106/308 F
[58] Field of Search ................... 106/308 Q, 308 F

[56] References Cited

U.S. PATENT DOCUMENTS

| | | | |
|---|---|---|---|
| 3,041,192 | 6/1962 | Brouillard et al. | 106/308 Q |
| 3,778,288 | 12/1973 | Ridge et al. | 106/308 Q |
| 3,867,172 | 2/1975 | Uhl et al. | 106/308 Q |
| 4,115,143 | 9/1978 | Batzar | 106/308 Q |

FOREIGN PATENT DOCUMENTS 1538718 3/1977 United Kingdom .

*Primary Examiner*—Carl F. Dees
*Attorney, Agent, or Firm*—Wilkinson, Mawhinney & Theibault

[57] ABSTRACT

Coloring composition for coloring thermoplastic polymers obtained by solidifying a liquid mixture of coloring pigments and an ester of phtalic acid and an alcohol. The composition contains at least 40% of pigments and at most 60% of an ester of phtalic acid and an alcohol comprising 12 to 16 carbon atoms.

6 Claims, No Drawings

COLORING COMPOSITION FOR COLORING THERMOPLASTIC POLYMERS

BACKGROUND OF THE INVENTION

1. Field of the Invention

The present invention relates to a colouring composition for colouring thermoplastic polymers, particularly vinylchloride polymers or copolymers and otherwise modified polyvinylchloride.

For colouring extrudable or injection mouldable thermoplastic polymers, colouring pigments are used on a large scale.

2. Description of the Prior Art

It is known e.g. in the art to manufacture by injection moulding plastics articles in various different colours, as required by the customers. Examples of such articles are pipe fittings, covers, boxes etc.

It is also known in the art to extrude thermoplastics pipes which have to meet different demands, with very particular colours, in order to avoid any risk of exchanging plastics pipes, to be used for a certain aim, with other pipes, which would be absolutely unsuitable for that aim. So, for instance, a plastics pipe for transporting water is given a colour differing from the colours used for pipes being employed for transport of gases.

Said colouring compositions present the disadvantage that the great fineness of the dye particles may be a nuisance, whilst furthermore, handling the empty packages of such colouring pigments requires much labour, so that transporting said empty packages and preventing the hindrance by fine dye particles, should be restricted to a minimum. It is not always possible to choose pigments without toxic character so that there is always danger of intoxication by handling such pigments.

Efforts have been made to obviate these disadvantages by providing the mixers, in which plastics are mixed with colouring pigments, with metering devices, metering the material on a volume- or on a weightbasis, thus allowing the use of containers with colouring pigments.

Metering devices allowing an accurate control of the quantity of colouring pigments to be dispensed are, however, extremely expensive; also measures have to be taken to avoid dusting.

Efforts have also been made to admix the colouring pigments with additives in the form of molten fatty acid amides and to cast the liquid composition into moulds, whereupon the moulded articles obtained after solidification may be used for forming a mixture with plastics, or to ground the moulded articles and to use the granulate particles as an additive for thermoplastics polymers to be coloured. The latter method is very inconvenient in that fatty acid amides melt at rather high temperatures, thus causing the risk of impairing the properties of organic colouring pigments. Moreover, the high melting points of the additive complicate proper dispersion of colouring pigments in the thermoplastic polymers.

SUMMARY OF THE INVENTION

In view of the foregoing factors and conditions of the prior art it is a primary object of the prevent invention to provide a colouring composition of the aforementioned type, avoiding all the disadvantages mentioned hereinbefore and the risk of impairing colouring pigments during mixing as well as avoiding intoxication of the plant.

This object is attained in accordance with the invention in that a colouring composition for colouring thermoplastic polymers to be extruded or injection moulded has been obtained by setting of a liquid mixture of colouring pigments and an ester of an aromatic dicarboxylic acid with an alcohol, said ester having a melting point above 25° C. but below 200° C.

The aromatic dicarboxylic acid is advantageously phtalic acid and the alcohol comprises preferably 12 to 22 carbon atoms.

Preferably the composition contains at least 40% of colouring pigment and at most 60% of said ester of phtalic acid.

A colouring composition of this type allows the colouring pigments to be admixed with the molten ester at much lower temperatures, so that the properties of the colouring pigments are not impaired due to high temperatures. Furthermore the esters are very good lubricating agents in thermoplastic polymers, such as polyvinylchloride so that according to the invention a lubricating agent is added to the plastics composition simultaneously with the colouring pigment. Moreover, the ester is very active in preventing discoloration of the plastics article due to the action of normal outside radiation.

The ester is very good acceptable with other additives added to polyvinylchloride, or other thermoplastic polymers.

The aforementioned colouring composition may be added to the thermoplastics to be extruded, during the admixture, but also directly to the extruder. Of course, the composition is also well suited for adding same to polyvinylchloride compositions to be used for injection moulding.

The esters of the composition of the invention are advantageously esters of phtalic acid and an alcohol chosen from the group of alcohols containing 10 to 18 or 20 to 22 carbon atoms, preferably mixtures containing all of the abovementioned alcohols.

Particular good results are obtained due to the low temperature of mixing, the ester provides an excellent internal lubrication action and the addition of these esters do not involve a rapid discoloration of the plastics.

It has been proved in actual practice, that an admixture of a colouring composition comprising said ester and a colouring pigment, in accordance with the invention, allows better results to be obtained than a separate admixture of the two substances of the colouring composition in accordance with the invention.

Very conveniently a colouring composition comprises up to 75% by weight of colouring pigments, the remaining percentage of said composition consisting of said ester serving as an internal lubricating agent.

Particularly preferred is a composition containing 75% by weight of colouring pigments and about 25% by weight of an ester of phtalic acid with fat alcohols containing 12 to 16 carbon atoms.

The invention also relates to a process of manufacturing articles of thermoplastic polymers by extrusion or injection moulding said polymers mixed with a lubricating agent and a colouring pigment, wherein a particulate colouring composition according to the invention is added to the polymer, preferably said composition containing at least 40% by weight of colouring pigments and at most 60% by weight of said ester.

Preferably, said ester is present in the final polymer article in a total amount of at most 5% by weight based on the polymer.

The features of the present invention which are believed to be novel are set forth with particularity in the appended claims.

Other claims and many of the attendant advantages will be more readily appreciated as the same becomes better understood by reference to the following detailed examples.

DESCRIPTION OF PREFERRED EMBODIMENTS

EXAMPLE I 5,5 kg of molten ester of phtalic acid with a mixture of fat alcohols comprising 12 to 16 carbon atoms as available on the market is admixed with 4,5 kg of cadmium-sulfide-yellow. After mixing the composition is solidified in moulds. The moulded compositions as obtained, which may be given a very accurate weight, may be supplied as such to the mixers for mixing same with polyvinylchloride.

The moulded compositions as produced may also be crushed in order to obtain granulate particles, which are suitable for mixing with polyvinylchloride to be extruded by means of an extruder.

EXAMPLE II

A colouring composition according to the present invention is prepared by mixing 50 kg ester of phtalic acid with stearyl alcohol with 50 kg phtalocyanine-green, whereupon the molten mixture is solidified in moulds and the moulded articles are crushed as to form granulate particles. Said granulate particles may be appropriately mixed with polyvinylchloride in the mixers.

In this manner green coloured polyvinylchloride pipes are obtained, the colouring properties and composition of which are much better than those of pigment particles and lubricating agents being separately added. No discoloration occurs in the time.

EXAMPLE III 75 kg phtalocyanine-blue are mixed with 50 kg of molten phtalic acid with cetylalcohol (C 16 alcohol), whereupon said mixture is cast into a mould so that the moulded compositions are obtained having a specifically defined weight. The products as such are supplied directly to the extruder for extruding polyvinylchloride which contains normal additives. The ester acts as a lubricating agent; the total amount of ester in the extruded polyvinylchloride amounts to 3%.

EXAMPLE IV 50 kg of black iron oxide is mixed with 50 kg of molten ester of phtalic acid with cetylalcohol. After mixing the molten mixture is cast into a mould and the moulded compositions are crushed in order to obtain granulate particles. Adding these granulates to an extruder fed with polyvinylchloride, provides a very convenient colouring, whilst the coloured pipe presents optimum properties and discoloration resistance. The end-products contain up to 5% of said ester.

EXAMPLE V 75 kg titanium dioxide is admixed with 25 kg molten ester of phtalic acid and stearyl alcohol and the molten mixture is cast into a mould. In this manner shaped compositions are obtained which are added to an extruder fed with polyvinylchloride. The total amount of ester in the extruded pipe is 4%.

EXAMPLE VI 75 kg of cadmium-yellow is mixed with 25 kg of molten ester of phtalic acid with cetylalcohol. After solidification and moulding of the composition the moulded composition is, after crushing, added to an injection moulding device fed with polyvinylchloride. The total amount of ester in the finished pipe fitting is 4% by weight. The respective pipe will be coloured very effectively, whilst said pipe will show very good properties and discoloration resistance.

EXAMPLE VII

Example VI is repeated, but now the colouring composition is added to polyvinylchloride to be extruded, which addition will take place while mixing said polyvinylchloride with other substances.

EXAMPLE VIII 75 kg of a brown colouring pigment are mixed with 25 kg of the ester of example III. After solidification a a moulded colouring composition is obtained which lends itself very appropriately for colouring polyvinylchloride.

What is claimed is:

1. Colouring composition for colouring thermoplastic polymers to be extruded or to be injection moulded the composition comprising a colouring pigment and a solid organic ester of an aromatic discarboxylic acid with an alcohol having 12 to 22 carbon atoms, said ester having a melting point above 25° C. but below 200° C. wherein the molten organic ester has been mixed with said colouring pigment substantially in the absence of water the composition containing at least 40% by weight of pigment and at most 60% by weight of said ester.

2. Colouring composition according to claim 1, wherein the aromatic dicarboxylic acid is phtalic acid.

3. Colouring composition according to claim 1, wherein said ester has been obtained by esterification with a mixture of alcohol.

4. Colouring composition according to claim 1, wherein the mixture of alcohols consists of alcohols comprising 16 to 18 and/or 20 to 22 carbon atoms.

5. Colouring composition according to claim 1, wherein the ester of stearylalcohol or of cetyl alcohol and phatalic acid is used.

6. The composition according to claim 1, wherein the total amount of esters being present in the moulded polymer article amounts to at most 5% and preferably amounts to 3 to 4%.

* * * * *